(12) United States Patent
Kshirsagar et al.

(10) Patent No.: US 9,170,845 B2
(45) Date of Patent: *Oct. 27, 2015

(54) DEPLOYED APPLICATION FACTORY RESET

(75) Inventors: Mohit Kshirsagar, Santa Clara, CA (US); David Olszewski, Campbell, CA (US); Akshaya Mahapatra, San Jose, CA (US); Faisal Choudry, London (GB); Archana Kumar, Santa Clara, CA (US)

(73) Assignee: VCE Company, LLC, Richardson, TX (US)

( * ) Notice: Subject to any disclaimer, the term of this patent is extended or adjusted under 35 U.S.C. 154(b) by 281 days.

This patent is subject to a terminal disclaimer.

(21) Appl. No.: 13/597,150

(22) Filed: Aug. 28, 2012

(65) Prior Publication Data

US 2014/0068022 A1    Mar. 6, 2014

(51) Int. Cl.
*G06F 15/177* (2006.01)
*G06F 9/50* (2006.01)
*H04L 12/24* (2006.01)

(52) U.S. Cl.
CPC ............ *G06F 9/5022* (2013.01); *G06F 9/5072* (2013.01); *G06F 9/5077* (2013.01); *H04L 41/08* (2013.01); *H04L 41/0803* (2013.01); *H04L 41/085* (2013.01); *H04L 41/0806* (2013.01); *H04L 41/0813* (2013.01); *H04L 41/0859* (2013.01)

(58) Field of Classification Search
CPC ... G06F 3/1415; G06F 9/5072; G06F 9/5077; H04L 12/2863; H04L 41/0253; H04L 41/08; H04L 41/085; H04L 41/0803; H04L 41/0813; H04L 41/0806; H04L 41/0859; H02J 3/00

USPC ......... 709/220, 202, 221, 222; 718/1; 714/23, 714/4; 707/610; 710/5
See application file for complete search history.

(56) References Cited

U.S. PATENT DOCUMENTS

| | | |
|---|---|---|
| 6,349,306 B1 | 2/2002 | Malik et al. |
| 7,210,143 B2 | 4/2007 | Or et al. |
| 7,249,189 B2 | 7/2007 | Refai et al. |
| 2003/0126202 A1 | 7/2003 | Watt |
| 2005/0004974 A1* | 1/2005 | Sharma et al. ................ 709/202 |
| 2007/0171921 A1* | 7/2007 | Wookey et al. ............... 370/401 |
| 2007/0198665 A1 | 8/2007 | De Matteis et al. |
| 2008/0209258 A1* | 8/2008 | Casale et al. ...................... 714/4 |
| 2008/0250405 A1 | 10/2008 | Farhangi et al. |
| 2008/0270973 A1 | 10/2008 | Edwards et al. |
| 2008/0288664 A1* | 11/2008 | Pettey et al. ....................... 710/5 |

(Continued)

OTHER PUBLICATIONS

International Search Report and Written Opinion regarding PCT/US2013/057075, dated Nov. 28, 2013.

(Continued)

*Primary Examiner* — Le H Luu
(74) *Attorney, Agent, or Firm* — Polsinelli PC

(57) ABSTRACT

A method and apparatus for integrating a converged infrastructure platform in a data center is provided. The described apparatus configures the physical and virtual resources that run on the converged infrastructure to communicate with the rest of the data center. The described apparatus further enables a system administrator to rollback configurations of the physical and virtual resources of the converged infrastructure to restore the converged infrastructure to a factory state.

27 Claims, 5 Drawing Sheets

(56) References Cited

U.S. PATENT DOCUMENTS

| | | |
|---|---|---|
| 2010/0071035 A1 | 3/2010 | Budko et al. |
| 2010/0121975 A1 | 5/2010 | Sinha et al. |
| 2010/0180016 A1* | 7/2010 | Bugwadia et al. ............ 709/220 |
| 2010/0299478 A1 | 11/2010 | Runcie et al. |
| 2011/0161947 A1 | 6/2011 | Ashok et al. |
| 2011/0251992 A1* | 10/2011 | Bethlehem et al. ........... 707/610 |
| 2011/0269111 A1 | 11/2011 | Elesseily et al. |
| 2012/0036552 A1* | 2/2012 | Dare et al. ........................ 726/1 |
| 2012/0137235 A1 | 5/2012 | T S et al. |
| 2012/0159245 A1* | 6/2012 | Brownlow et al. ............. 714/23 |
| 2012/0210319 A1* | 8/2012 | Recio et al. ....................... 718/1 |
| 2012/0266231 A1 | 10/2012 | Spiers et al. |
| 2012/0310435 A1* | 12/2012 | Taft ............................... 700/297 |
| 2013/0007265 A1 | 1/2013 | Benedetti et al. |
| 2014/0068032 A1* | 3/2014 | Kannan et al. ................. 709/221 |

OTHER PUBLICATIONS

F. Oliveira et al., Blutopia: Cluster Life-Cycle Management, Nov. 7, 2005, retrieved from http://domino.research.ibm.com/library/cyberdig.nsf/papers/5a54BE032FC9E8F4852570B5005F82D6/$File/rc23784.pdf.

* cited by examiner

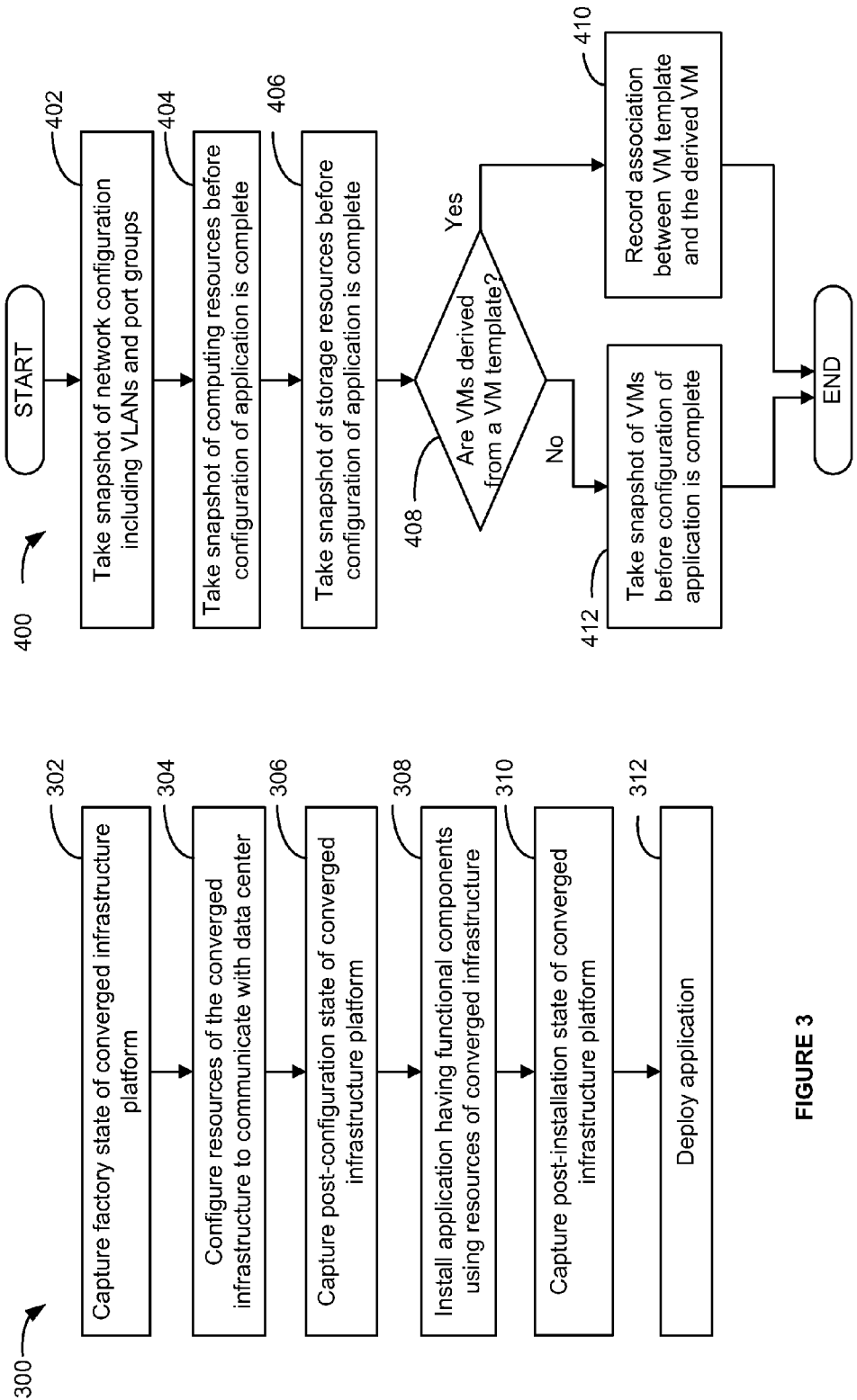

DEPLOYED APPLICATION FACTORY RESET

BACKGROUND OF THE INVENTION

1. Field of the Invention

Embodiments of the present invention generally relate to a method for installing a computing block platform within an existing data center.

2. Description of the Related Art

Generally, in a virtualized computer environment, virtual machines are configured to run on one or more host computers. Each virtual machine uses CPU and memory resources of one of the host computers and runs its own operating system and application programs to give the appearance that it is operating as a stand-alone computer system. The amount of CPU and memory resources provisioned for each of the virtual machines on a host computer can be designated by an administrator of the virtualized computer environment. In some virtualized environments, load balancing is enforced across multiple host computers by software that monitors resource usage on different host computers. Such software migrates virtual machines from one host computer to another, e.g., from a busy host computer to one that has excess capacity.

Additionally, enterprises engaged in developing, testing, and deploying software applications need to deal with many layers of the targeted platform. These layers include application services, virtualization, and hardware infrastructure with compute, network, storage, and management at all levels. Information technology (IT) and engineering groups also acquire, deploy, and provide ongoing management, as well as ensure the layers work seamlessly together. This increases an enterprise's initial and ongoing cost, extends the development cycle, and reduces flexibility needed to respond to changes in the market.

Further, the traditional enterprise information technology (IT) roles such as server administrator, UNIX administrator, and network, storage or exchange administrator, have been generally static. The roles operate in isolation, or "silos", which cause friction within IT organizations, as well as between developers and IT. Further, it is difficult for developers to play the role of IT administrator when their developed applications are deployed as "cloud applications." This difficulty is due not only to various access-controls, authentication and authorization complexities, but also to a model of organizational separation between developers and IT, where the default behavior is to deny access to the resources.

As such, there is a demand for a more efficient operational model for administrating computing infrastructure.

SUMMARY OF THE INVENTION

Embodiments of the present disclosure provide a method for installing an integrated computing platform into an existing computing environment. The method includes configuring an integrated computing platform to communicate with at least one service running in an existing computing environment outside of the integrated computing platform. The integrated computing platform includes an application having a plurality of functional components using a plurality of networking, storage, computing, and virtualized resources of the integrated computing platform. The method further includes restoring each of the plurality of networking, storage, computing, and virtualized resources of the integrated computing platform to a state prior to the configuring the integrated computing platform to communicate with the service running in the existing computing environment outside of the integrated computing platform.

Embodiments of the present disclosure provide an integrated computing platform. The integrated computing platform includes a plurality of networking, storage, computing, and virtualized resources having an application with a plurality of functional components executing thereon. The integrated computing platform includes a management server configured to configure the integrated computing platform to communicate with at least one service running in an existing computing environment outside of the integrated computing platform. The management server is further configured to restore each of the plurality of networking, storage, computing, and virtualized resources of the integrated computing platform to a state prior to the configuring the integrated computing platform to communicate with the service running in the existing computing environment outside of the integrated computing platform.

Embodiments of the present disclosure provide a non-transitory computer-readable storage medium comprising instructions that, when executed in a computing device, install an integrated computing platform into an existing computing environment, by performing the steps of configuring an integrated computing platform to communicate with at least one service running in an existing computing environment outside of the integrated computing platform. The integrated computing platform may include an application having a plurality of functional components using a plurality of networking, storage, computing, and virtualized resources of the integrated computing platform. The instructions, when executed, also perform the steps of restoring each of the plurality of networking, storage, computing, and virtualized resources of the integrated computing platform to a state prior to the configuring the integrated computing platform to communicate with the service running in the existing computing environment outside of the integrated computing platform.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 3 is a flow diagram of method steps for deploying an integrated computing platform in an existing data center, according to certain aspects of the present disclosure.

FIG. 4 is a flow diagram of method steps for capturing state of an integrated computing platform, according to certain aspects of the present disclosure.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
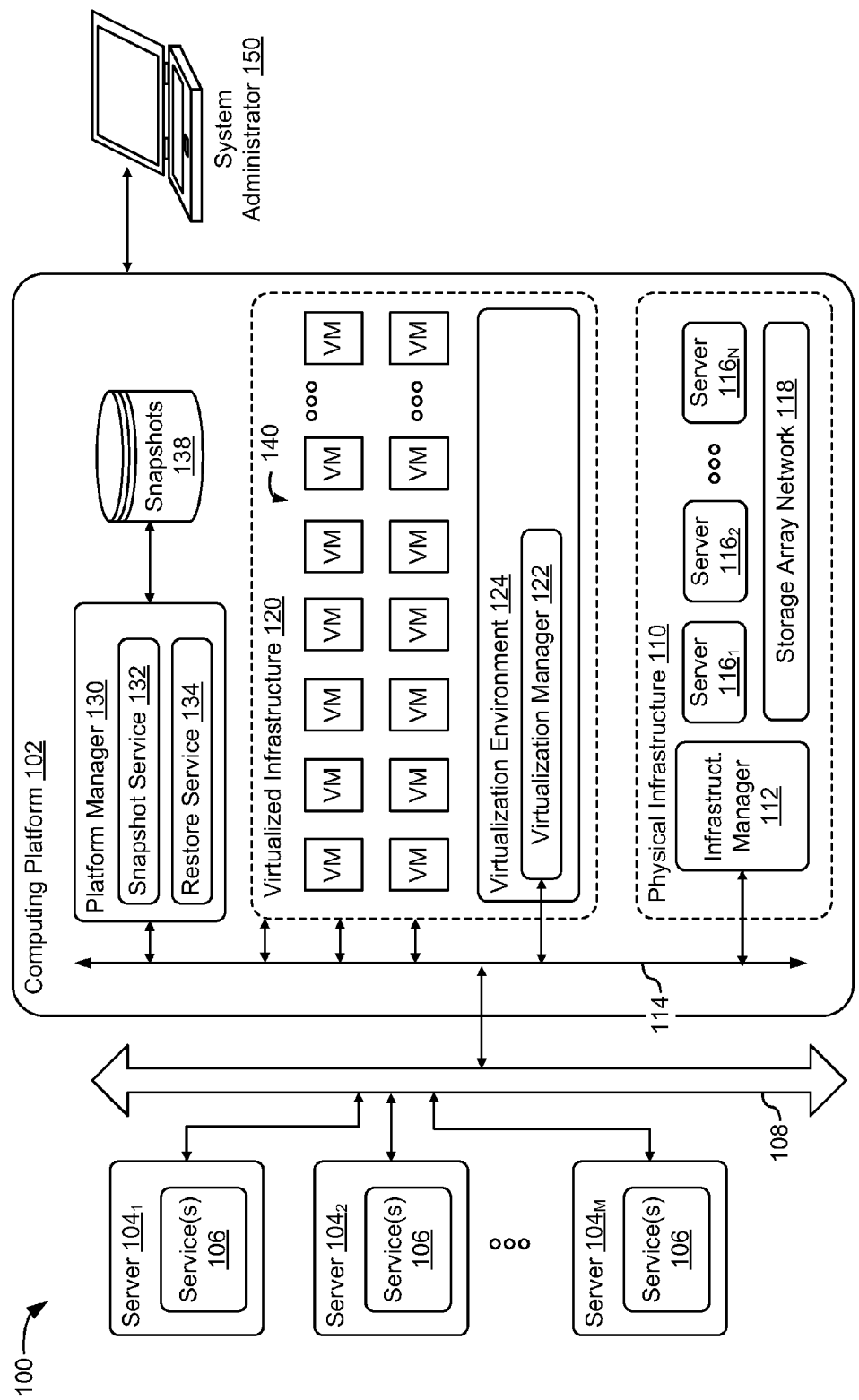
FIG. 1 illustrates an integrated computing platform configured for providing a virtualized environment according to one embodiment of the present disclosure.

Embodiments of the present disclosure use a computing block platform, sometimes referred to as converged infrastructure, that consolidates IT infrastructure into a pool of virtualized physical as well as computing, storage, and networking capacity that is shared by multiple application and lines of businesses have been proposed to address the problem of silo architectures and IT sprawl. When an enterprise uses a converged infrastructure platform, the enterprise may be faced with the challenge of integrating the new converged infrastructure platform within any existing computing infrastructure, such as a data center. Before a converged infrastructure platform can be used by an enterprise, the physical resources (e.g., blade servers, network switches, storages) and virtual machines that are "inside" the converged infrastructure platform have to be configured to communicate with physical resources and virtual machines that are "outside" the configured infrastructure platform, and vice versa. Further, a converged infrastructure platform may be configured to run an application having multiple functional components (e.g., executing on multiple virtual machines). At least one of the functional components may rely on existing services running outside of the converged infrastructure, and must be configured to communicate with any required services running in the existing data center.

As such, to install a converged infrastructure platform having an application pre-loaded therein, a number of changes may have to be made to the networking, storage, and computing resources of the converged infrastructure platform. For example, the network within the converged infrastructure has to understand the data center network already in place, extend the network setup into the converged infrastructure platform, and enable communication between the converged infrastructure and the rest of the network in the data center. To complete installation, the converged infrastructure platform may create new VLANs and port groups, as well as change new virtual machines and edit settings of existing virtual machines.

However, if the installation fails (e.g., unable to connect with the network of the existing data center), it may be desirable to "rollback" changes done to the system such that the installation may start again from a clean state. Accordingly, embodiments of the present disclosure provide an administrative application that generates snapshots of the various resources (e.g., networking, storage, computing, virtual) of the converged infrastructure platform before and after configuration for an application. The administrative application may initiate a rollback operation that restores configurations to the networking, storage, computing, and virtual resources. A rollback or reset of the application means not only reverting to known snapshots on the virtual infrastructure (e.g., virtual machines), but also roll back of configurations changes of physical resources to free up those resources for future needs.

FIG. 1 illustrates an integrated computing platform 102 configured to provide a virtualized environment, according to one embodiment of the present disclosure. A system administrator 150 desires to deploy the integrated computing platform 102 within an existing computing environment (e.g., data center 100). The data center 100 may include a plurality of servers (illustrated as servers $104_1$, $104_2$, $104_M$) that run one or more services 106. It should be recognized that the servers 104 may include conventional computing components (e.g., processor, memory, storage) or may be virtual machines (VMs) executing on such physical hardware. The services 106 running on the servers 104 provide one or more IT functions within the data center, including directory services, web server, database server, accounting, application serving, file management, storage, backup services, etc. As described in detail below, the system administrator may wish to deploy the integrated computing platform 102 such that the physical resources and virtual resources (e.g., VMs) running inside of the integrated computing platform 102 may communicate with the services 106 of the existing data center 100.

As shown, the computing platform 102 includes a physical infrastructure 110 configured to support a virtualized infrastructure 120. In the embodiment shown in FIG. 1, physical infrastructure 110 includes hardware resources, such as servers $116_1$ to $116_N$ (sometimes referred to as "hosts") and one or more storage array networks (SAN), such as SAN 118, connected by a network 114. The virtualized infrastructure 120 may include a virtualization environment 124 which itself includes one or more virtual machines 140. The computing platform 102 may be connected to other computing systems, such as workstations, personal computers, data center servers, via a network 128, such as the Internet. In one embodiment, components of the computing platform 102 (e.g., servers, network, storage, software, etc.) may be organized into a single integrated framework sometimes referred to as "converged infrastructure." The components of the computing platform 102 provide a pool of virtualized server, storage, network resources shared by multiple applications and/or organizations within an enterprise.

According to one embodiment, the physical infrastructure 110 may be organized into a "computing-block" based infrastructure, wherein physical infrastructure units are characterized by repeatable units of construction having similar performance, operational characteristics, and discrete requirements of power, space, and cooling that facilitate rapid deployment, integration, and scalability. For example, the "computing block" may dynamically provision hardware resources based on performance demands placed on the physical infrastructure 110. One example of physical infrastructure 110 is a Vblock™ System available from the VCE Company, LLC.

The physical infrastructure 110 further includes an infrastructure manager 112 configured to manage the configuration, provisioning, and policy compliance of the physical infrastructure 110. Infrastructure manager 112 provides an interface to manage the provisioning of hardware resources (e.g., computing, networking, storage) with policy-based automation. According to one embodiment, the infrastructure manager 112 may be included in each unit of physical infrastructure 110 to manage the configuration, provisioning, and compliance of each distinct computing block. The infrastructure manager 112 may simplify deployment and integration into IT service catalogs and workflow engines, and dramatically simplifies computing-block platform deployment by abstracting the overall provisioning while offering granular access to individual components for troubleshooting and fault management.

In one embodiment, the infrastructure manager 112 may include a configuration including a list of IP address and system credentials to assign newly provisioned systems. The platform manager 130 and/or the virtualized infrastructure 120 may connect to and communicate with the infrastructure manager 112 of the physical infrastructure 110 to manage and/or configure the physical infrastructure 110. One example of an infrastructure manager includes EMC Ionix Unified Infrastructure Manager (UIM) available from EMC Corporation. Similarly, the network 114 may include a network manager configured to configure network devices (e.g., switches, routers) and manage addressing, subnets, virtual local area networks (VLANs), and other network configurations. One example of a network manager includes a Cisco Switch accessible via a Cisco IOS command line interface (CLI) available from Cisco System, Inc.

The virtualized infrastructure 120 includes a virtualization environment 124 configured to simulate (i.e., to virtualize) conventional components of a computing device, e.g., a processor, system memory, a hard disk drive, for executing one or more virtual machines 140. For example, each virtual machine 140 may include a virtual processor and a virtual system memory configured to execute an application. In one example implementation of an embodiment similar to that of FIG. 1, virtualization environment 124 may be implemented by running VMware vSphere®—or VMware ESX®-based hypervisor technologies on servers $116_1$ to $116_n$ provided by VMware, Inc. of Palo Alto, Calif. (although it should be recognized that any other virtualization technologies, including Xen® and Microsoft Hyper-V virtualization technologies may be utilized consistent with the teachings herein). As described above, a hypervisor application may provide a foundation for building and managing a virtualized IT infrastructure, such as the virtualized infrastructure 120. The hypervisor may abstract processor, memory, storage and networking resources into multiple virtual machines that run unmodified operating systems and applications.

In one embodiment, the virtualized infrastructure 120 may be managed by a virtualization manager 122 (e.g., implemented as a process running in a virtual machine in one embodiment). In one embodiment, the virtualization manager 122 may provide end-to-end datacenter management through a set of APIs that enable integration with third-party management tools. The virtualization manager 122 may be configured to manage provision of VMs 140 within the virtualized infrastructure 120 and to configure VMs 140 with computing, network, and storage configurations suitable for interoperability with other VMs 140 within the virtualized infrastructure 120. One example of the virtualization manager 122 may be the VMware vCenter virtualized management platform from available from VMware, Inc.

As shown, the computing platform 102 also includes a platform manager 130 connected to the virtualized infrastructure 120 and physical infrastructure 110 by the communications network. The platform manager 130 is configured to provision and configure resources from physical infrastructure 110 and virtualized infrastructure 120 for use in deploying an application within the computing platform 102. For example, if virtualized infrastructure 120 requires additional VMs to scale a currently running application during peak traffic, platform manager 130 can coordinate with the virtualization manager 122 to instantiate additional virtual machines to support such needs and configure the instantiated virtual machines with network settings matching those existing virtual machines. In another example, the platform manager 130 may modify an existing VM 140 to add, remove, or configure virtual resources, such as a virtual network interface card (vNIC), assigned to the VM.

As shown, the platform manager 130 includes a snapshot service 132 configured to save a configuration state of the computing platform 102, across all levels of resources of the computing platform 102, including networking resources (e.g., network 114), storage resources (e.g., SAN 118), computing resources (e.g., servers 116), and virtual resources (e.g., VMs 140). In one embodiment, the snapshot service 132 may save the configuration state as "snapshots" 138 of the networking, storage, computing, and virtual machines. The type of a snapshot 138 may vary depending on the type of resource captured. For example, a snapshot of a VM 140 may comprise a container file that encapsulates the state of a VM including its documents and data, and information about its virtual hardware (e.g., CPU, memory, disk, etc.); a reference or link to a container file; or a delta file describing differences between one or more container files. In another example, a snapshot of a networking resource (e.g., network 114) includes a log of administrative operations performed on the networking sources, such as adding VLANs, creating DMZs, etc.

As shown, the snapshot service 132 may maintain a repository of snapshots 138 that may be later used to restore configuration changes to the resources of the computing platform 102. In one embodiment, the repository of snapshots 138 may be implemented as a repository of operations performed on the networking, storage, computing, and virtual resources of the computing platform 102. In operation, the snapshot service 132 may add, remove, and update entries in the repository as needed. For example, the snapshot service 132 may purge a set of entries in the repository of snapshots 138 in response to determining a successful installation and deployment of the computing platform 102 within the data center 100, the set of entries now extraneous.

In one embodiment, the platform manager 130 includes a restore service 134 configured to restore the computing platform 102 to a previously saved state. The restore service 134 may use snapshots retrieved from the repository of snapshots 138 to restore the computing platform 102 to a previous state, for example, such as to a state saved prior to an erroneous installation of the computing platform 102. In some embodiments, the restore service 134 may execute a series of operations selected to undo configuration changes made to networking, storage, computing, and virtual resources. For example, the restore service 134 may instruct a network manager of the network 114 to remove a VLAN that was added during installation, or instruct the infrastructure manager 112 to de-allocate a blade 116 or storage volume that were provisioned during installation.

In some embodiments, prior to the installation of the computing platform 102, an application having one or more functional components may be installed or loaded onto the computing platform 102. Each functional component of the application performs one or more tasks of the application and/or provide a functional layer of the application (e.g., in a multi-tiered application). The functional components include a variety of software components, operating systems, and configurations (e.g., executing on a VM 140) that inter-operate to function as a multi-tiered application. For example, the functional components of a deployed web application may include a web server, application server, and database server, each executing on a VM 140 from the virtualized infrastructure 120.

In some embodiments, an installation process for the computing platform 102 into an existing data center 100 includes configuring resources of the computing platform 102 to enable the pre-loaded application and its functional components that are running within the computing platform 102 to communicate with existing services 106 of the data center 100. In one example, the platform manager 130 may make configuration changes to the networking, storage, computing, and virtual resources of the computing platform 102 for a virtual desktop infrastructure (VDI) running within the computing platform 102, and is shown in greater detail in FIG. 2.

Figure 2:
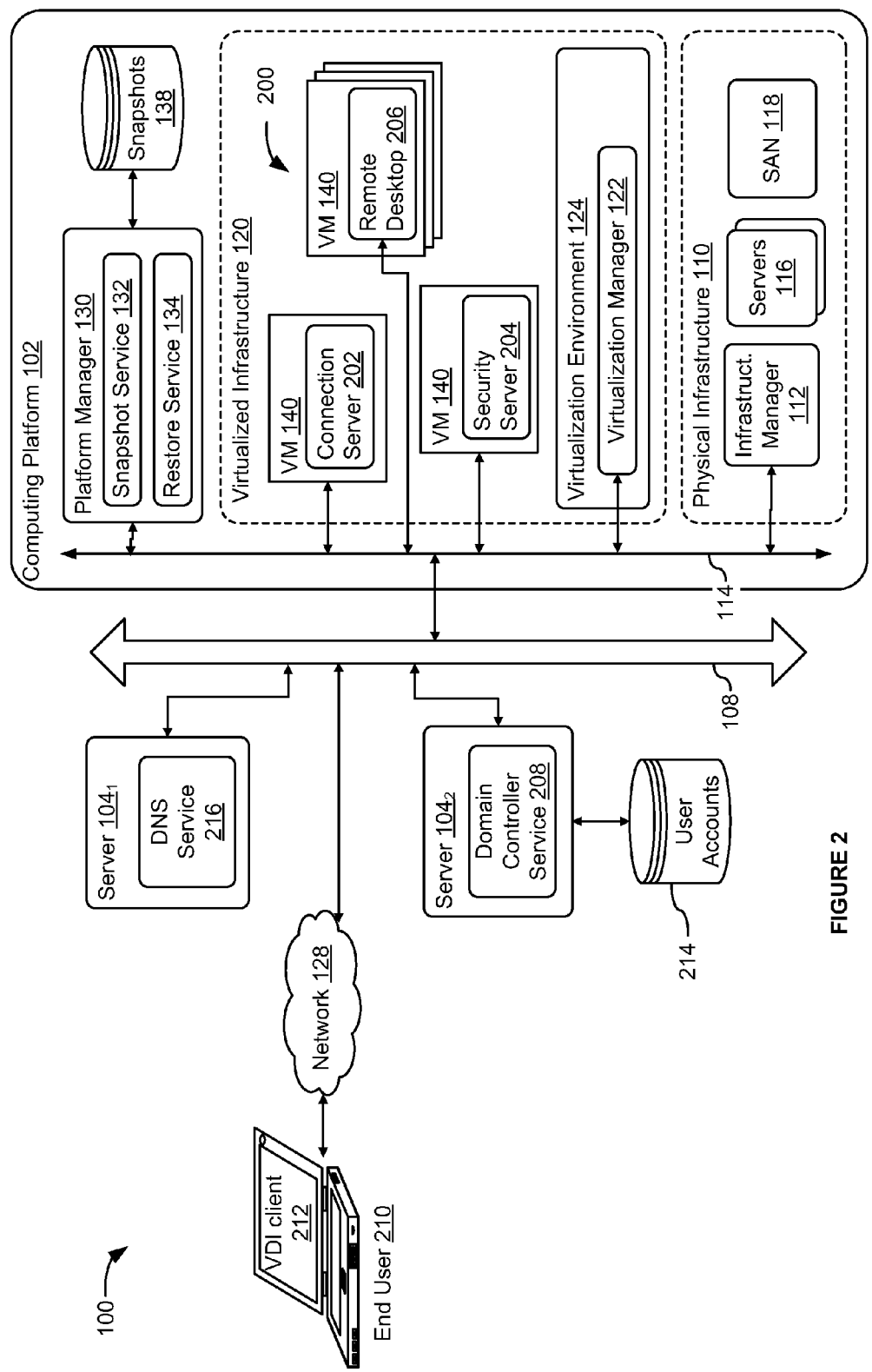
FIG. 2 illustrates an application-specific deployment of the integrated computing platform of FIG. 1, according to one embodiment of the present disclosure.

FIG. 2 illustrates a computing platform 102 executing an application 200 to be integrated into the existing data center 100, according to one embodiment of the present disclosure. As shown, the platform manager 130 may deploy a virtual desktop infrastructure (VDI) 200 on a plurality of VMs 140 within the virtualized infrastructure 120. One example of VDI system 200 includes the VMware View system available from VMware, Inc.

In a VDI system 200, an end user 210 uses a VDI client software program (e.g., VDI client 212), running on an operating system of a local computing device, to access their desktop which may be running in one of VMs 140 in the computing platform 102 that may be remote from the end user's location. Note that the term "desktop" generally refers to the instance of an interactive operating environment provided by a computer operating system and software applications, typically in the form of a display and sound output and keyboard and mouse input. With VDI clients 212, users can access remote desktops 206 running in a remote data center (e.g., computing platform 102) through the network 128, from any location, using a general purpose computer running a commodity operating system and a VDI client software program such as VMware® View™, or a special purpose thin client such as those available from Dell, HP, NEC, Sun Microsystems, Wyse, and others.

As shown, the VDI system 200 includes a connection server 202 that provides user authentication for remote desktops 206 and direct incoming desktop requests (e.g., from VDI client 212) to a corresponding remote desktop 206. Illustratively, the VDI system 200 further includes one or more security servers 204 (e.g., executing in one or more VMs 140) that enable secure access to the remote desktops 206 from an external network, such as the Internet. The security server 204 may act as a proxy host for connections inside a trust network (e.g., network 114) and shields the connection server 202 from request a public-facing Internet. For simplicity, a single network is shown but it should be recognized that, in actual implementations, the components of VDI system 200 may be connected over the same network or different networks. Furthermore, a particular configuration of the virtualized desktop infrastructure is described above and illustrated in FIG. 2, but it should be recognized that one or more embodiments of the present invention may be practiced with other configurations of the virtualized desktop infrastructure.

During installation of the VDI system 200 and the computing platform 102 within the data center 100, the connection server 202 may be connected to a domain controller 208, such as Microsoft® Active Directory®, already running within the existing data center 100 (e.g., on a server 104$_2$). The domain controller 208 manages user accounts 214 (e.g., a user account for end user 210) including user log-in information and credentials. Further, the connection server 202 and security server 204 may be connected to a domain name system (DNS) service 216 which is installed on a server 104$_2$ outside of the computing platform 102 to provide domain names to the functional components of the VDI system 200 (e.g., connection server 202, security server 204, and remote desktops 206). The virtualization manager 122 may need to be connected with a "management plane" within the data center 100 and be able to access the connection server 202 and security server 204. Network architecture for the VDI system 200 may be set up that includes one or more virtual local access networks (VLANs) between the connection server 202, security server 204, remote desktops 206, domain controller 208, DNS service 216 across networks 108 and 114. For example, a system administrator 150 needs access to the connection server 202 and security server 204 to configure them. Further, a VDI client 212 operated by an end user 210 would need access to the connection server 202 and the security server 204 (e.g., via the networks 128, 108, 114). The one-to-many relationships between the functional components of the VDI system 200 and the network 128 of the data center 100 that would need to be extended onto the computing platform 102 to ensure proper operation of the VDI system 200.

While FIG. 2 depicts a particular example of an application (e.g., VDI system 200), other applications running within the computing platform 102 may be deployed that have components that connect to and communicate with services 106 executing in the data center 100. For example, a computing platform 102 having an application with an application server layer, a data grid layer, and a database layer may be integrated within the services of the existing data center 100.

FIG. 3 is a flow diagram of method steps for deploying an integrated computing platform in an existing data center, according to certain aspects of the present disclosure. As shown, the method 300 begins at step 302, where the platform manager 130 captures a "factory state" of the computing platform 102. The term "factory state" may be used to describe a state of the computing platform 102 prior to the resources of the computing platform 102 being initialized and configured (e.g., as in steps 304 and 308 below). In one embodiment, the snapshot service 132 takes an initial snapshot of the networking resources (e.g., network 114), storage resources (e.g., SAN 118), computing resources (e.g., servers 116), and virtual resources (e.g., VMs 140) on the computing platform 102. The operations for capturing a state of the computing platform are described in greater detail in conjunction with FIG. 4.

At step 304, the platform manager 130 provision resources of the computing platform 102 for executing an application and configures the resources to communicate with the data center 100. In some embodiments, the platform manager 130 allocates physical and virtual resources from the computing platform 102 for executing functional components of the application. In one embodiment, the platform manager 130 configures the resources of the computing platform 102 to inter-operate with services 106 of the data center 100. The platform manager 130 may direct the infrastructure manager 112 to configure the networking resources (e.g., network 114) and hosts (e.g., servers 116) to assign VLANs, port groups, set qualify of service (QoS) settings, and other parameters need to connect the functional components of the application to the services 106 of the data center. The platform manager 130 may direct the virtualization manager 122 to configure VMs 140 to add a network interface card (NIC) for accessing services 106 outside of the computing platform 102 and for services 106 outside of the computing platform 102 to communicate with the VMs 140.

In the example of the VDI system 200, the platform manager 130 may configure the resources of the computing platform 102 to enable communication between the connection server 202 to the domain controller 208, to enable communication between the security server 204 and the network 108, and to enable connection between the plurality of remote desktops 206 and the network 108. Examples of configurations that may be set include assigning an IP address configured for management of the domain controller 208, assigning an IP address configured for access to the domain controller 208, assigning authentication information for the domain controller 208, assigning a VLAN ID that the computing platform 102 should use for communicating with the "management plane" of the data center 100, assigning VLAN ID that the computing platform 102 should use for communicating with the data center "access" network, assigning IP addresses for management and user access to be assigned to the functional components of the VDI system 200, assigning the IP address of the DNS service 216 on the data center network 108, and assigning a subnet mask and gateway IP address for the VMs 140 within the computing platform 102.

In one embodiment, the platform manager 130 may configure the resources of the physical infrastructure 110 and virtualized infrastructure 120 based on values provided a system administrator 150 (e.g., entered via a graphical user interface).

In another embodiment, the platform manager 130 may configure the resources of the physical infrastructure 110 and virtualized infrastructure 120 based on an infrastructure template. An infrastructure template specifies infrastructure parameters that describe the existing computing environment (e.g., data center 100) in which the integrated computing platform 102 is being deployed. Examples of infrastructure parameters specified by the infrastructure template may include VLAN identifiers that the network 114 of the computing platform 102 should use for communicating with the network 108 of the existing data center 100, IP addresses of a DNS service running within the data center 100, and a range of IP addresses, subnet masks, and gateway IP address to be assigned to VMs 140 of the computing platform 102. In some embodiments, the infrastructure template may be provided for a specific application deployed within the computing platform 102. As such, the infrastructure parameters contained in the infrastructure template may address specific configurations, settings, and information needed by the application executing within the computing platform 102. In one implementation, the infrastructure template may be implemented as an Extensible Markup Language (XML) document, though any suitable structured or semi-structured data structure may be used, such as a relational database or key-value data store. An example of an infrastructure template provided for installing a computing platform 102 having a deployed VDI system 200 with the data center 100 is shown in Table 1 below.

TABLE 1

Sample Infrastructure Template

```
<?xml version="1.0" encoding="UTF-8" ?>
<Infra-Template>
    <VLans>
        <VLan>
            <id>4040</id>
            <name>Infra</name>
        </VLan>
        <VLan>
            <id>4051</id>
            <name>Client</name>
        </VLan>
    </VLans>
    <DHCPVirtualMachines>
        <VMNameFilters>
            <VMNameFilter>*CLIENT*</VMNameFilter>
            <VMNameFilter>SC-*</VMNameFilter>
        </VMNameFilters>
    </DHCPVirtualMachines>
    <VirtualMachinesWithStaticIp>
        <VM>
            <VMName>VM01</VMName>
            <Ip>192.168.15.150</Ip>
            <GatewayIp>192.168.15.1</GatewayIp>
            <mask>255.255.255.0</mask>
            <DNS>192.168.15.150</DNS>
```

TABLE 1-continued

Sample Infrastructure Template

```
            <Domain>example.com</Domain>
        </VM>
        <VM>
            <VMName>VM02</VMName>
            <Ip>192.168.15.151</Ip>
            <GatewayIp>192.168.15.1</GatewayIp>
            <mask>255.255.255.0</mask>
            <DNS>192.168.15.150</DNS>
            <Domain>example.com</Domain>
        </VM>
    </VirtualMachinesWithStaticIp>
</Infra-Template>
```

In embodiments where the platform manager 130 configures the resources of the computing platform 102 using an infrastructure template, the platform manager 130 may store the infrastructure template within the repository of snapshots 138, as information to be used for any rollback operations in the future.

At step 306, the snapshot service 132 captures a post-configuration state of the computing platform 102. As described in greater detail later, the restore service 134 may use the captured post-configuration state to restore the computing platform 102 to its factory state.

At step 308, the platform manager 130 installs the application having a plurality of functional components using resources of the computing platform 102. For example, the platform manager 130 may deploy a VDI application (e.g., VDI system 200) that includes a plurality of VMs 140 executing a connection server 202, security server 204, and remote desktops 206. In one embodiment, the platform manager 130 may invoke a call that directs the virtualization manager 122 (e.g., through a set of APIs) to create one or more VMs (e.g., VMs 140) having virtual resources (e.g., VRAM, storage) to execute the functional components of the application. The platform manager 130 deploys instances of the functional components on the allocated resources. For example, the platform manager 130 may install software packages onto the provisioned VMs 140, or alternatively, the platform manager 130 may invoke a call that directs the virtualization manager 122 (e.g., through a set of APIs) to create one or more VMs (e.g., VMs 140) based on a pre-packaged VMs having the application components and guest operating system pre-installed thereon. In some embodiments, the platform manager 130 may create instances of a functional component based on a VM template that defines a VM having pre-installed software components, operating system, and configurations corresponding to a particular functional component.

At step 310, after the installation of the application has been completed, the snapshot service 132 may take a snapshot of the networking, storage, computing, and virtual resources of the computing platform 102 that captures the post-installation state of the converged infrastructure platform (e.g., computing platform 102). The post-installation snapshot may be captured similarly to the snapshots generated in steps 302 and 306 above.

At step 312, the platform manager 130 finalizes set up of the application and launches the application. In the example of the VDI system 200, the platform manager may deploy a pool of remote desktops 206 supported by VMs 140 executing in the virtualized infrastructure 120. In one embodiment, the platform manager 130 may import a VM template that serves as a model for the remote desktops 206 (sometimes referred to as a "gold image") and deploys multiple VMs based on the gold image to create a pool of remote desktops for the VDI system 200.

FIG. 4 is a flow diagram of method steps for capturing state of an integrated computing platform, according to certain aspects of the present disclosure. Persons skilled in the art will understand that, even though the method 400 is described in conjunction with the systems of FIGS. 1 and 2, any system configured to perform the method steps, in any order, is within the scope of embodiments of the present disclosure.

At step 402, the snapshot service 132 takes a snapshot of network configurations for network 114 of the computing platform 102. In some embodiments, the snapshot service 132 records information regarding VLANs assignments, logical networks, port groups, and other network configurations of virtual switches, IP switches, Ethernet switches, and storage switches (e.g., fibre channel) that comprise the networking resources. The snapshot service 132 may store the snapshot of the network configurations in the repository of snapshots 138.

At step 404, the snapshot service 132 takes a snapshot of computing resources before configuration of the application is complete. For example, the snapshot service 132 records a state of the servers 116 (e.g., blades, server chassis, fabric interconnects). At step 406, the snapshot service 132 takes a snapshot of storage configuration for the storage resources (e.g., SAN 118). For example, the snapshot service 132 records a state of the storage configurations including storage arrays, logical volumes, RAID volumes, data replication, backup and recovery settings. In some embodiments, the snapshot service 132 communicates with the infrastructure manager 112 to obtain configuration states for the computing and storage resources. The snapshot service 132 may store the snapshot of the computing and storage configurations in the repository of snapshots 138.

At step 408, the snapshot service 132 takes a snapshot of the state of the virtualized infrastructure 120 including the plurality of VMs 140. As shown, the snapshot service 132 determines, for each of the VMs 140, whether a VM had been cloned or instantiated from a VM template. For example, the snapshot service 132 may determine that a VM 140 executing connection server 202 may have been derived from VMs templates for functional components of the VDI system 200. In another example, the snapshot service 132 may determine that a VM 140 may have been created from a VM template from a library of VM templates provided by the virtualization manager 122.

At step 410, responsive to determining that the VM was not derived from a template, the snapshot service 132 may take a snapshot of the VM 140 and record the snapshot in the repository of snapshots 138. In one embodiment, the snapshot may include a container file containing serialization of all data, environment, and state of the VM 140, for example, formatted in an Open Virtualization Format (OVF) or other suitable structure. At step 412, responsive to determining that a VM was derived from a VM template, rather than take a snapshot of the VM, the snapshot service 132 records an association or link between the VM template and the derived VM. The snapshot service 132 may record the association or link between the derived VM and the VM template within the repository of snapshots 138. It should be recognized that steps 408, 410, and 412 may be repeated for capturing snapshots of each of the VMs 140 in the virtualized infrastructure 120.

In some embodiments, the snapshots 138 may be implemented as a recordation of all configuration operations executed on resources of the computing platform 102. To capture snapshots, the snapshot service 132 may gather (e.g., from the infrastructure manager and virtualization manager) logs that report what configuration operations were performed on what resources of the computing platform 102. The snapshot service 132 may limit what logged operations it collects based on a time period. For example, the snapshot service 132 may define a "before" snapshot as a point in time prior to configuration of the resources and define an "after" snapshot as a point in time after the configuration of the resources (e.g., step 304 above). The snapshot service 132 may store this collection of operations in the repository of snapshots 138.

After installation of the application has been completed and the application is deployed, a system administrator 150 may later wish to undo the installation of the application and restore the computing platform 102 to its factory state (or other states during the installation process). For example, the system administrator 150 may determine that the application is operating improperly and may desire to redo the installation process. In another use case, the system administrator 150 may be experimenting with a variety of different deployment schemes during a proof of concept (POC) or testing phase, and wishes to start "fresh" from the beginning of the installation process each time.

Figure 5:
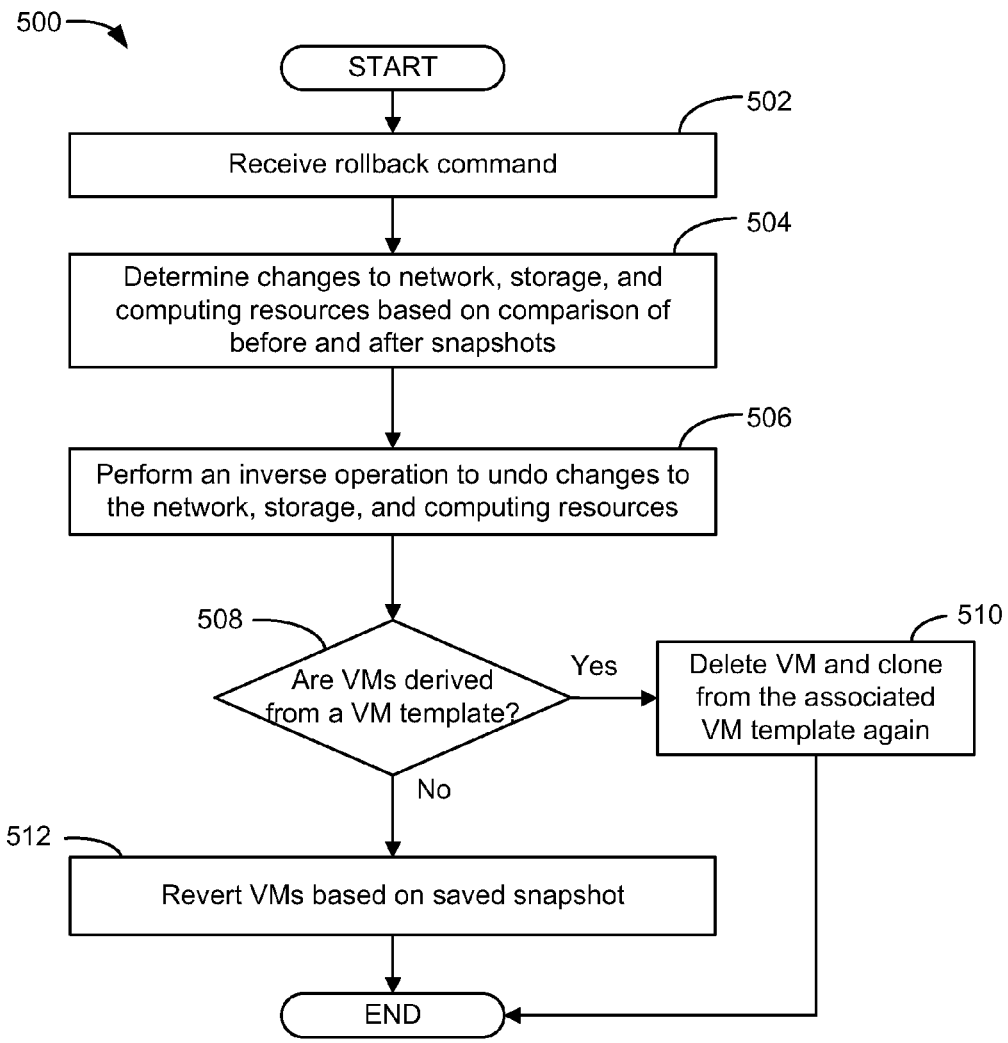
FIG. 5 is a flow diagram of method steps for restoring configuration changes to an integrated computing platform installed in an existing data center, according to certain aspects of the present disclosure.

FIG. 5 is a flow diagram of method 500 for restoring configuration changes to an integrated computing platform installed in an existing data center, according to certain aspects of the present disclosure. Persons skilled in the art will understand that, even though the method 500 is described in conjunction with the systems of FIGS. 1 and 2, any system configured to perform the method steps, in any order, is within the scope of embodiments of the present disclosure.

At step 502, the platform manager 130 may receive a "rollback" command, e.g., from the system administrator, for restoring configuration changes to the resources (e.g., network 114, SAN 118, servers 116, VMs 140, etc.) of the computing platform 102. In one embodiment, the rollback command may select a snapshot from the repository of snapshots 138 to which the state of the computing platform 102 is to be restored. In another embodiment, the rollback command may indicate a subset of the resources of the computing platform 102 to be restored. For example, the rollback command may indicate that only configuration changes to the network 114, and not to the storage 118 or VMs 140, are to be restored to the state of the selected snapshot. As such, the rollback command may provide a component-by-component granularity in its ability to restore configuration state of the resources of the computing platform 102. For sake of the foregoing discussion, the rollback command is assumed to indicate all levels of resources (e.g., networking, storage, computing, and virtual machines) have been selected for restoration.

At step 504, the restore service 134 determines the changes made to the networking, storage, and computing resources based on a comparison of the snapshots taken before and after configuration. In one embodiment, the restore service 134 determines an inverse operation that undoes a configuration change between the before snapshot and the after snapshot. For example, the restore service 134 may determine that a port group was added to the network 114. The restore service 134 may then formulate a "delete" operation to delete the port group from the network 114. In another example, the restore service 134 may determine that a "delete vlan" operation is needed to undo an "add vlan" operation that was performed between snapshots. The restore service 134 may determine similar inverse operations for the storage and computing resources.

At step 506, the restore service 134 performs the determined inverse operation to undo changes to the network, storage, and computing resources of the computing platform 102. In one embodiment, the restore service 134 communicates with the infrastructure manager 112 (e.g., via an API call) to execute the inverse operation and restore the network 114, storage 118, and servers 116 to their factory state.

Beginning at step 508, the restore service 134 determines whether the VMs 140 are derived from a VM template. At step 510, the restore service 134 deletes any VMs 140 that were derived from a VM template, retrieves the original VM template, and clones a new instance of the VM based on the VM template. Alternatively, at step 512, responsive to detecting a VM that was not derived from a VM template, the restore service 134 retrieve a snapshot of the VM 140 from the repository of snapshots 138. The restore service 134 directs the virtualization manager 122 to perform a revert operation to return the state of the VM to that of the snapshot retrieved from the repository. It should be recognized that steps 508, 510, and 512 may be repeated for restoring state of each of the VMs 140 in the virtualized infrastructure 120.

Figure 6:
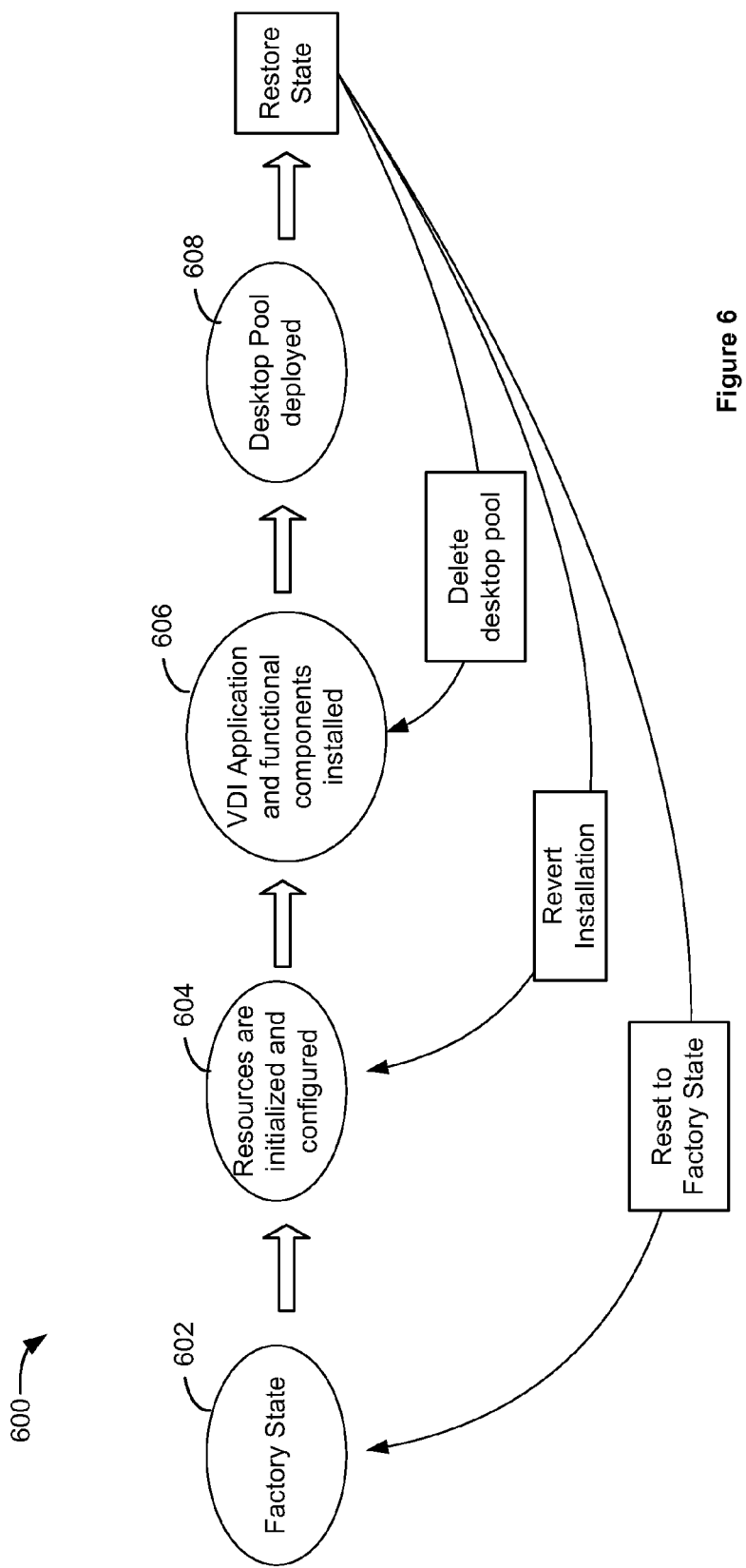
FIG. 6 is a state diagram illustrating a workflow for resetting state of an integrated computing platform during installation of an application, according to certain aspects of the present disclosure.

FIG. 6 is a state diagram 600 illustrating a workflow for resetting state of an integrated computing platform, according to certain aspects of the present disclosure. The state diagram 600 includes states 602, 604, 606, 608 that represent the different states of the computing platform 102 during installation of a VDI application (e.g., VDI system 200).

As shown, after the installation process has been completed (e.g., at state 608), a system administrator 150 may invoke rollback operation that restores the state of the computing platform 102 to one of a variety of states captured during the installation process. In one embodiment, the rollback operation may restore the computing platform 102 to a factory state 602, which undoes any configuration changes made during the installation process. For example, a system administrator 150 may wish to factory reset the computing platform when relocating the computing platform 102 to a new site (e.g., new data center 100).

In another embodiment, the rollback operation may revert the installation of the VDI application 200 and restore the computing platform 102 to a post-configuration state 604, whereby any changes made to the computing platform 102 during installation of the functional components of the VDI system 200 are reverted. For example, restoring to the post-configuration state 604 would remove the instances of the connection servers 202 and security servers 204 deployed during the installation process. In yet another embodiment, the rollback operation may delete the pool of remote desktops and restore the computing platform 102 to a post-installation state 606, wherein the VDI application 200 and its functional components have been installed. This operation enables a system administrator 150 to replace the "gold image" or VM template that defines instances of the remote desktop 206 and deploy a new pool of remote desktops.

Accordingly, embodiments of the present disclosure advantageously enables system administrators 150 to easily test their applications and reset the converged infrastructure platform to defaults in order to test various use cases. As a result, the time and cost to do a proof of concept (POC) or test deployment is greatly reduced, thereby reducing the time to integrate components of a converged infrastructure with services of a data center. Embodiments of the present disclosure further reduce the risk of error during configuration of network resources and security services, which may be a manual and error-prone process.

Various embodiments of the present disclosure may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments and numerous specific details are set forth to provide a more thorough understanding of the invention. Persons skilled in the art, however, will understand that various modifications and changes may be made thereto without departing from the broader spirit and scope of the invention. The foregoing description and drawings are, accordingly, to be regarded in an illustrative rather than a restrictive sense.

While the foregoing is directed to embodiments of the present disclosure, other and further embodiments of the present disclosure may be devised without departing from the basic scope thereof, and the scope thereof is determined by the claims that follow.

The invention claimed is:

1. A method for installing an integrated computing platform into an existing computing environment, the method comprising:
   using a template associated with an application, obtaining a snapshot of a configuration state of a plurality of networking, storage, computing, and virtualized resources of the integrated computing platform that are to be used by the application;
   configuring the integrated computing platform to communicate with at least one service running in an existing computing environment that is separate from the integrated computing platform, wherein the integrated computing platform includes the application having a plurality of functional components using a plurality of the networking, storage, computing, and virtualized resources of the integrated computing platform;
   restoring, using the snapshot, each of the plurality of networking, storage, computing, and virtualized resources associated with the application to a state prior to the configuring the integrated computing platform to communicate with the service running in the existing computing environment outside of the integrated computing platform.

2. The method of claim 1, wherein the integrated computing platform is configured to enable communication between the functional components of the application and the service executing within the existing computing environment.

3. The method of claim 1,
   wherein the snapshot represents a configuration state of the resources of the integrated computing platform and wherein the template comprises parameters associated with one or more configuration settings of the application.

4. The method of claim 1, further comprising:
   prior to the restoring, determining a plurality of configuration operations performed on the plurality of networking, storage, computing, and virtualized resources of the integrated computing platform during installation of the application.

5. The method of claim 1, wherein restoring the plurality of networking, storage, computing, and virtualized resources of the integrated computing platform comprising:
determining an inverse operation to undo a configuration change made to the plurality of networking, storage, computing, and virtualized resources of the integrated computing platform.

6. The method of claim 1, wherein restoring each of the plurality of networking, storage, computing, and virtualized resources comprises:
restoring a configuration state of the networking, storage, computing, and virtualized resources based on the snapshot of the configuration state.

7. The method of claim 1, wherein the virtualized resources comprise a plurality of virtual machines (VMs), and wherein restoring each of the virtualized resources comprises:
responsive to determining a VM is derived from a VM template, deleting the VM and creating a new instance of the VM template.

8. The method of claim 1, wherein the virtualized resources comprise a plurality of virtual machines (VMs), and wherein restoring each of the virtualized resources comprises:
responsive to determining a VM is not derived from a VM template, retrieving the snapshot of the VM from a repository of snapshots; and
reverting the state of the VM based on the retrieved snapshot.

9. The method of claim 1, wherein the functional components comprise virtual machines executing application components of a virtual desktop infrastructure.

10. An integrated computing platform, comprising:
a plurality of networking, storage, computing, and virtualized resources having an application with a plurality of functional components executing thereon; a management server configured to:
using a template associated with the application, obtain a snapshot of a configuration state of a plurality of networking, storage, computing, and virtualized resources of the integrated computing platform that are to be used by the application;
configure the integrated computing platform to communicate with at least one service running in an existing computing environment that is separate from the integrated computing platform, wherein the integrated computing platform includes the application having a plurality of functional components using a plurality of the networking, storage, computing, and virtualized resources of the integrated computing platform;
restore, using the snapshot, each of the plurality of networking, storage, computing, and virtualized resources associated with the application to a state prior to the configuring the integrated computing platform to communicate with the service running in the existing computing environment outside of the integrated computing platform.

11. The integrated computing platform of claim 10, wherein the integrated computing platform is configured to enable communication between the functional components of the application and the service executing within the existing computing environment.

12. The integrated computing platform of claim 10, wherein the snapshot represents a configuration state of the resources of the integrated computing platform.

13. The integrated computing platform of claim 10, wherein the management server is further configured to, prior to the restoring, determine a plurality of configuration operations performed on the plurality of networking, storage, computing, and virtualized resources of the integrated computing platform during installation of the application.

14. The integrated computing platform of claim 10, wherein the management server is further configured to:
determine an inverse operation to undo a configuration change made to the plurality of networking, storage, computing, and virtualized resources of the integrated computing platform.

15. The integrated computing platform of claim 10, wherein the management server is further configured to:
restore a configuration state of the networking, storage, computing, and virtualized resources based on the snapshot of the configuration state.

16. The integrated computing platform of claim 10, wherein the virtualized resources comprise a plurality of virtual machines (VMs), and wherein the management server is further configured to:
responsive to determining a VM is derived from a VM template, delete the VM and creating a new instance of the VM template.

17. The integrated computing platform of claim 10, wherein the virtualized resources comprise a plurality of virtual machines (VMs), and wherein the management server is further configured to:
responsive to determining a VM is not derived from a VM template, retrieve the snapshot of the VM from a repository of snapshots; and
revert the state of the VM based on the retrieved snapshot.

18. The integrated computing platform of claim 10, wherein the functional components comprise virtual machines executing application components of a virtual desktop infrastructure.

19. A non-transitory computer-readable storage medium comprising instructions that, when executed in a computing device, install an integrated computing platform into an existing computing environment, by performing the steps of:
using a template associated with an application, obtaining a snapshot of a configuration state of a plurality of networking, storage, computing, and virtualized resources of the integrated computing platform that are to be used by the application;
configuring the integrated computing platform to communicate with at least one service running in an existing computing environment that is separate from the integrated computing platform, wherein the integrated computing platform includes the application having a plurality of functional components using a plurality of the networking, storage, computing, and virtualized resources of the integrated computing platform;
restoring, using the snapshot, each of the plurality of networking, storage, computing, and virtualized resources associated with the application to a state prior to the configuring the integrated computing platform to communicate with the service running in the existing computing environment outside of the integrated computing platform.

20. The non-transitory computer-readable storage medium of claim 19, wherein the integrated computing platform is configured to enable communication between the functional components of the application and the service executing within the existing computing environment.

21. The non-transitory computer-readable storage medium of claim 19,
wherein the snapshot represents a configuration state of the resources of the integrated computing platform.

22. The non-transitory computer-readable storage medium of claim 19, further comprising instructions for:

prior to the restoring, determining a plurality of configuration operations performed on the plurality of networking, storage, computing, and virtualized resources of the integrated computing platform during installation of the application.

23. The non-transitory computer-readable storage medium of claim 19, wherein the instructions for restoring the plurality of networking, storage, computing, and virtualized resources of the integrated computing platform comprise instructions for:
    determining an inverse operation to undo a configuration change made to the plurality of networking, storage, computing, and virtualized resources of the integrated computing platform.

24. The non-transitory computer-readable storage medium of claim 19, wherein the instructions for restoring each of the plurality of networking, storage, computing, and virtualized resources comprises instructions for:
    restoring a configuration state of the networking, storage, computing, and virtualized resources based on the snapshot of the configuration state.

25. The non-transitory computer-readable storage medium of claim 19, wherein the virtualized resources comprise a plurality of virtual machines (VMs), and wherein the instructions for restoring each of the virtualized resources further comprises instructions for:
    responsive to determining a VM is derived from a VM template, deleting the VM and creating a new instance of the VM template.

26. The non-transitory computer-readable storage medium of claim 19, wherein the virtualized resources comprise a plurality of virtual machines (VMs), and wherein the instructions for restoring each of the virtualized resources further comprises instructions for:
    responsive to determining a VM is not derived from a VM template, retrieving the snapshot of the VM from a repository of snapshots; and
    reverting the state of the VM based on the retrieved snapshot.

27. The non-transitory computer-readable storage medium of claim 19, wherein the functional components comprise virtual machines executing application components of a virtual desktop infrastructure.

* * * * *